US007319854B2

(12) United States Patent
vonDoenhoff et al.

(10) Patent No.: US 7,319,854 B2
(45) Date of Patent: Jan. 15, 2008

(54) AUTOMATIC AIRPLANE SEAT LOCATION MAPPING

(75) Inventors: Roger C. vonDoenhoff, Federal Way, WA (US); Sudhakar S. Shetty, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 452 days.

(21) Appl. No.: 11/117,810

(22) Filed: Apr. 29, 2005

(65) Prior Publication Data

US 2006/0246892 A1 Nov. 2, 2006

(51) Int. Cl.
*H04B 1/06* (2006.01)
*H04B 7/00* (2006.01)

(52) U.S. Cl. ........................ 455/345; 455/98; 455/41.2

(58) Field of Classification Search ............ 455/422.1, 455/431, 41.2, 515, 98, 99, 297, 345; 725/76, 725/77, 79, 81, 85
See application file for complete search history.

(56) References Cited

U.S. PATENT DOCUMENTS 5,880,867 A * 3/1999 Ronald ....................... 398/119
6,002,944 A * 12/1999 Beyda ..................... 455/554.1
6,140,921 A * 10/2000 Baron et al. ................ 340/540
6,249,913 B1 * 6/2001 Galipeau et al. .............. 725/76
6,269,243 B1 * 7/2001 Corbefin et al. ............ 455/431
6,690,659 B1 2/2004 Ahmed et al.
7,027,767 B2 * 4/2006 de La Chapelle et al. . 455/3.06
2005/0039208 A1 * 2/2005 Veeck et al. .................. 725/76
2005/0162396 A1 * 7/2005 Meckesheimer et al. .... 345/169
2006/0174285 A1 * 8/2006 Brady et el. .................. 725/76

* cited by examiner

*Primary Examiner*—Sonny Trinh
(74) *Attorney, Agent, or Firm*—MacPherson Kwok Chen & Heid LLP; Tom Chen

(57) ABSTRACT

During a system reconfiguration, a selected column or column of wireless units, such as associated with airplane seats, are powered up. The first unit in the column detects a ground and begins a wireless identification process with an access point which allows the system to determine a corresponding physical location for each node's logical address. The first unit then closes a switch, which connects the ground to the next unit. As the next unit detects the ground on the line, such as a token line, the second unit communicates with the AP. This process continues sequentially down the column until the last unit is assigned a physical location/address. The next column of units can then be powered up and identified.

23 Claims, 3 Drawing Sheets

AUTOMATIC AIRPLANE SEAT LOCATION MAPPING

BACKGROUND

1. Field of Invention

This invention generally relates to identification of wireless users and, more particularly, to locating seats using wireless devices in an airplane.

2. Related Art

In current airplanes, passengers can activate devices/indicators and communicate with the flight crew through various mechanisms, such as buttons or other controls located overhead, along the seat console, in front of the seat, or other convenient locations. With wireless communication technology becoming more accepted and widespread, communication between passengers in seats and airplane systems is being implemented using wireless technology, such as 802.11 protocols. However, in order to use wireless communication to activate seat-specific devices (such as reading lights and flight attendant call lights), the physical location of the seat unit needs to be known, in addition to any logical addressing assignments (such as IP address). For example, when a reading light button is pressed, the system must know which light to activate; hence, it must know the seat client's physical location.

In wired communication systems, seat unit location identification has been accomplished through existing serial data communication lines along a column of seats. In such systems, seat units transmit location information along the lines sequentially, e.g., from the first seat in the column to the last seat. However, such techniques cannot be used with wireless systems, due in part to the lack of wired communication lines in wireless systems.

Therefore, there is a need for identifying seat units in a wireless system that overcomes the disadvantages of conventional techniques discussed above.

SUMMARY

According to one aspect of the present invention, a ground wire is serially connected to a plurality of wireless clients or units in a wireless communication system. This single ground wire introduces much less cost and complexity into the system than would a serial or parallel data communication line. Each wireless client includes a switch that when closed provides a ground connection to subsequent clients. The ground connection is sequentially propagated along the wireless units, where only units detecting the ground connection communicate with a server through a wireless access point (AP). Using this sequential ground ("token") propagation in combination with power control which allows the system to control which columns are powered up at a given time, the AP can sequentially communicate with wireless units to provide locations and IP addresses for subsequent communications between the individual units and the server.

In one embodiment, when identification of the wireless units is desired, such as when the system is reconfigured or initiated, all the units in a single column are powered up and all switches are open, such that only the first unit detects a ground connection. The server, through the AP, broadcasts messages to the wireless units, but only the units detecting the ground connection communicate back. Thus, upon detection of the ground, the first unit transmits a request for a physical location/address assignment from the server. All other units have an open circuit with the ground connection so that these units do not detect the ground connection and do not communicate with the server. The server sends this first unit a location assignment and other related information.

Upon receipt, the first unit closes a switch, which connects the ground to the second unit. The second unit then communicates with the server, with the server sending a location assignment and other related information to the second unit. When the second unit receives the location assignment, the corresponding ground switch is closed, which connects the ground to the third unit. This continues until the last unit in the column is assigned a location. As the switches are closed during this process, units having received location assignments continue processing, such as association tasks with the server.

Once the last unit in the column has received a location assignment, all units or seats in a column are mapped. The server can then instruct a power supply for a second column to supply power to units in that column. Identification and location assignment can then continue with this second column. In such a manner, units in multiple columns, such as seats in an airplane, can be identified and mapped using a simple serial ground wire system.

These and other features and advantages of the present invention will be more readily apparent from the detailed description of the preferred embodiments set forth below taken in conjunction with the accompanying drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
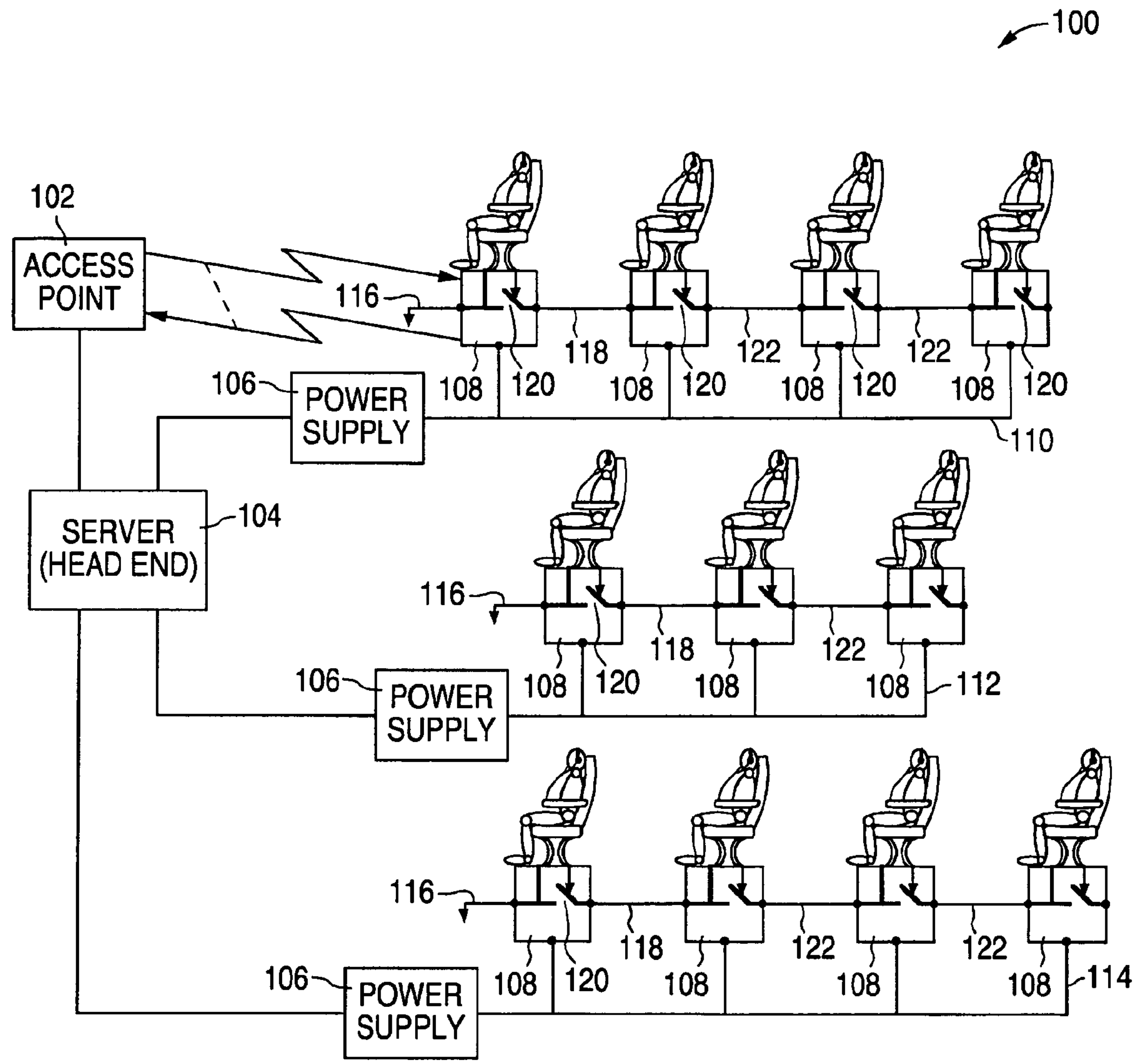
FIG. 1 is a diagram of a wireless identification system having multiple columns according to one embodiment of the present invention.

FIG. 1 is a diagram showing a system 100 for identifying and mapping units in a wireless communication system according to one embodiment. In this example, the wireless communication system is in an airplane, with the wireless units associated with seats on the airplane. System 100 includes a base station or access point (AP) 102, a server 104, such as an In-Flight Entertainment (IFE) Head End, three network controlled power supplies, such as 7E7 Remote Power Distribution Units (RPDUs) 106, and three columns of wireless stations or units 108. Each wireless unit is associated with an individual seat. System 100 is shown with four wireless units 108 in the first column, three wireless units 108 in the second column, and four wireless units 108 in the third column. The number of columns and wireless units shown in FIG. 1 is for illustration only, as any suitable number of columns and wireless units can be used with the present invention.

Each plurality of wireless units in a column is coupled to a conductive line, which enables power supplies 106 to provide power to all units in specific columns. For example, four wireless units 108 in the first column are coupled to a first conductive line 110, three wireless units 108 in the second column are coupled to a second conductive line 112, and the four wireless units 108 in the third column are coupled a third conductive line 114. Each of the power supplies is connected to server 104 so that server 104 can transmit signals to appropriate power supplies 106 to power up selected power lines 110 and/or 112 and/or 114. As a result, power can be delivered to wireless units in desired columns.

Each column of wireless units also includes a ground wire 116, such as a conductive wire attached to a ground source, connected to the first wireless unit in each column. Thus, the first wireless unit in each column always is connected to ground wire 116. A first wire segment 118 is connected between the first wireless unit and the second wireless unit in each column. A switch 120 in the first wireless unit is coupled between ground wire 116 and first wire segment 118. When switch 120 is closed, first wire segment 118 is connected to ground wire 116, which connects the second wireless unit to ground. Additional wire segments 122 are connected between subsequent adjacent wireless units in each column, with switch 120 in each wireless unit 108 enabling connection of the ground signal to a subsequent wireless unit. Switch 120 can be any suitable switch, such as a transistor or relay.

According to one embodiment of the present invention, a "ground" token or signal can be sequentially propagated through each wireless unit 108 in a single powered-up column, such as along a "token" line. Note that multiple or groups of columns can be powered-up at once instead of just one column at a time. As each wireless unit "sees" or senses the ground signal, the wireless unit begins association with AP 102. In this manner, the wireless units in a first column can be automatically identified to the access point and assigned an according physical location identifier and IP address. After identification of the last unit in the first column is initiated, the wireless units in a second column are powered up and sequentially associated with the AP.

Figure 2:
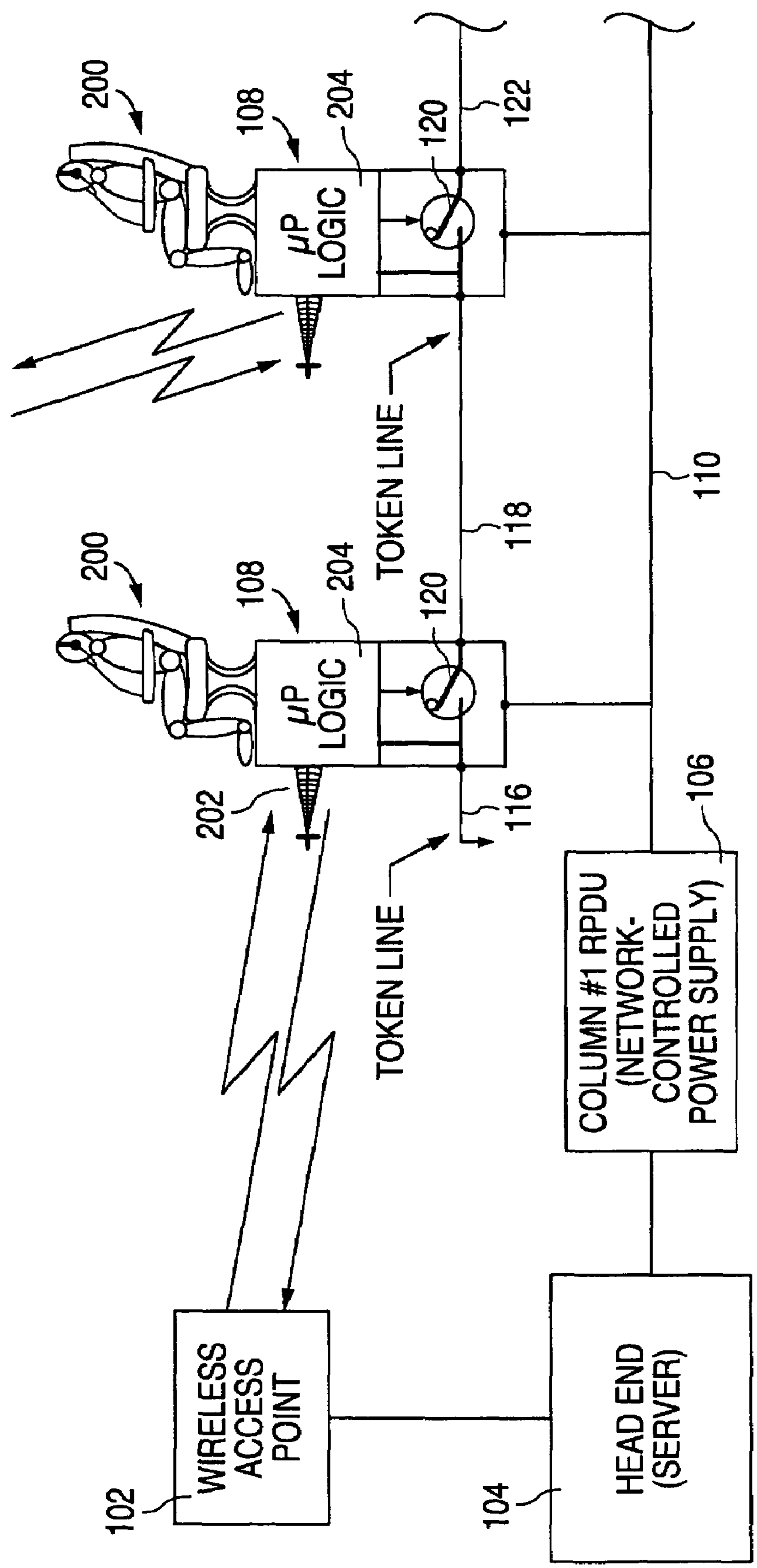
FIG. 2 is an enlarged diagram of a portion of one of the columns of the system of FIG. 1.
Figure 3:
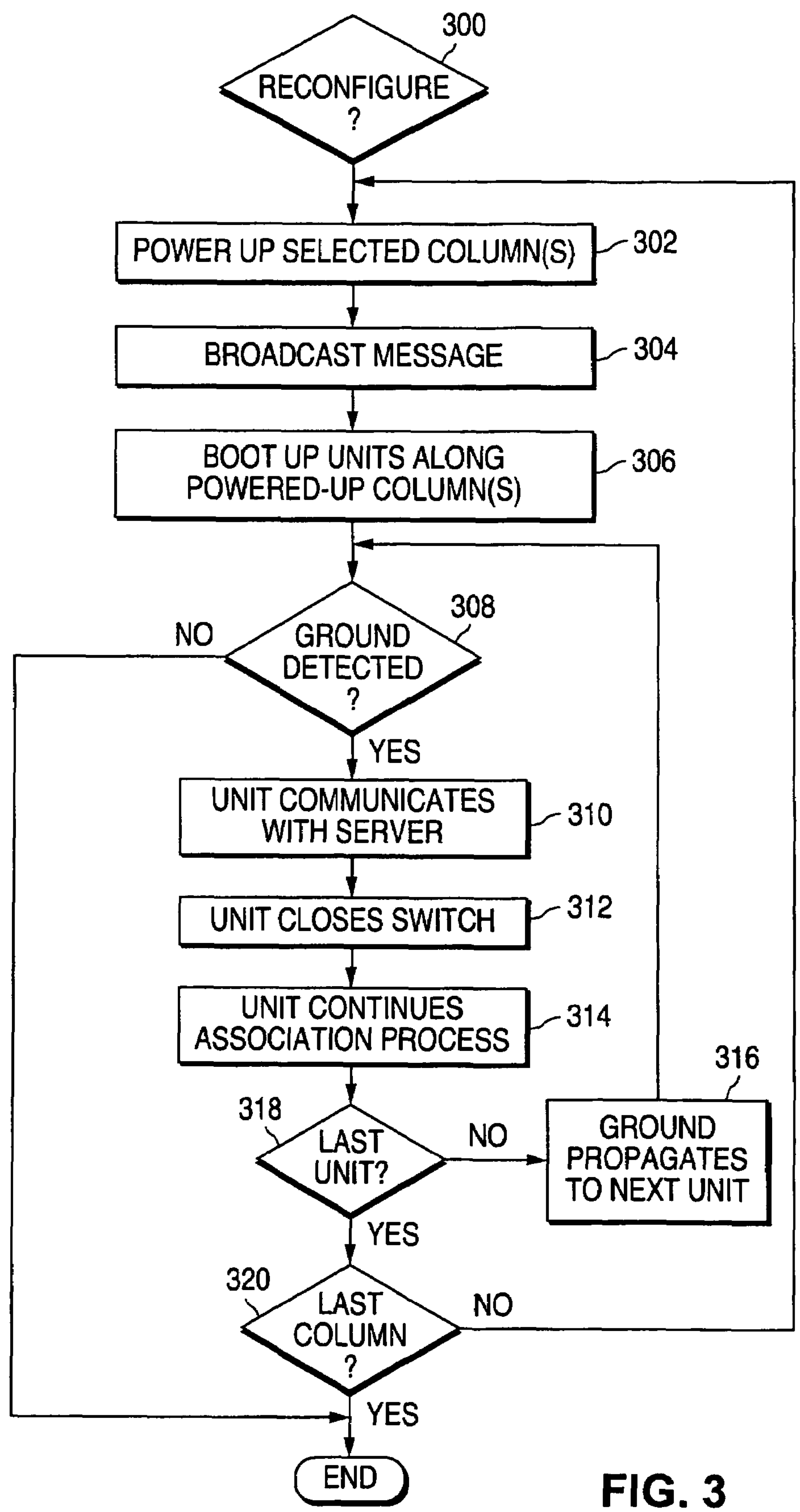
FIG. 3 is a flow chart illustrating a process for identifying wireless units in a column.

FIGS. 2 and 3 are, respectively, an enlarged diagram of a portion of FIG. 1 and a flowchart illustrating an exemplary process of wireless unit identification according to one embodiment. FIG. 2 shows the first two wireless units 108 in a column. Each wireless unit 108 is associated with a seat 200 in an airplane. For example, if server 104 is part of an In-Flight Entertainment (IFE) system, seat 200 needs to know which seat it is in the system so that the passenger using the seat can fully utilize functions associated with the IFE system. For example, the specific seat needs to be known to the system, e.g., server 104, so that the server can identify to the flight attendant which passenger has pushed the flight attendant call button or send the appropriate signals to a specific seat, such as reading lights, movies, or music. As such, the wireless units for each seat need to be identified within the network.

Wireless unit 108 can be any suitable wireless station, such as 802.11 conformant devices. The units can be any device that can function within a wireless protocol, e.g., with 802.11 physical layer (PHY) interfaces to the wireless medium and Media Access Control (MAC) that utilizes Carrier Sense Multiple Access with Collision Avoidance (CSMA/CA) protocol. In one embodiment, wireless unit 108 has an antenna 202 and a microprocessor 204, which includes a wireless transceiver having baseband and RF circuitry, interface circuitry, logic circuitry, and a memory. The transceiver provides and accepts MAC frames to/from a protocol stack in the processor. When the wireless unit is associated with an AP in the network, the interface circuitry provides a bi-directional interface to the network, i.e., a connection point to AP 102 at wireless unit 108. The memory may include volatile, e.g., DRAM, and non-volatile memory, e.g., SRAM. The protocol stack includes a network layer comprising a PHY layer and a MAC layer.

Wireless unit 108 also includes switch 120, which can be internal to microprocessor 204 in some embodiments. Switch 120 is operable to either connect ground line 116 to or disconnect ground line 116 from first segment wire 118.

In an initial state, such as reconfiguration of the system, switch 120 is open (shown in FIG. 2) so that ground line 116 is only connected to the first wireless unit of each column. Thus, when a column is powered up, only the first wireless unit detects the ground signal from ground line 116. This indicates to the first wireless unit that it is to associate with AP 102.

Once the association process begins, such as the wireless unit sending an association request or receiving settings from AP 102, the wireless unit closes its switch, which connects ground line 116 with first wire segment 118. As a result, the second wireless unit in the column detects a ground signal from ground line 116 and first segment wire 118. Upon detecting ground from the "token" line, microprocessor 204 communicates with server 104 through AP 102 for physical location/address assignment and association. This process continues along each wireless unit in the powered-up column until the last wireless unit has been identified by server 104. At this point, one or more other columns can be powered up to start the sequential association process. The system powers up columns in a specific pattern, so that it is a combination of the column power-up sequence and the token line ground-passing sequence that allows the system to determine which individual physical location to assign to the currently-communicating client.

Wireless units 108 and AP 102, along with server 104, comprise a typical wireless network. Communication within the network, such as to the server, is provided through the AP. The wireless units associate with the AP in order to gain access to the network. Thus, initially when a wireless unit joins the network, such as during a re-configuration or start-up of the network, it locates the AP to associate with before any delivery of data can occur.

FIG. 3 is a flowchart illustrating one example of a process of the present invention. In operation 300, the server determines if a reconfiguration of the system is required, such as when the system is first powered up or a new system is installed. If reconfiguration is needed, the server transmits power to a desired column or columns of wireless units in operation 302. In one embodiment, the server sends a signal to one or more network-controlled power supplies coupled to the columns, which in response, provides the necessary power to the associated column of wireless units. The remaining columns of wireless units are not supplied power.

Next, in operation 304, the server broadcasts, through the access point, a reconfiguration message, such as with a beacon, over the wireless network. During this process, each wireless station will be associating with the single access point (AP).

Next, all wireless units along the column or columns that have been powered up begin to boot up in operation 306. Once the wireless units have booted up, only the first wireless unit in each powered-up column will then detect the ground signal in operation 108. Since all switches in the wireless stations are opened at this time, no other wireless units will detect this ground signal on their token lines. In operation 308, the units determine whether a ground is detected on the token line. If no ground is detected, the reconfiguration process for the unit is not continued at this point. However, if a wireless unit detects this ground signal, that wireless unit begins communicating with the AP and server in operation 310. On initial reconfiguration, only the first units will detect ground.

Communication in operation 310 includes an association process in which the wireless unit identifies itself with the AP and server. In one embodiment, the wireless unit receives an address assignment based on its physical location, e.g., the seat number on the plane.

After communication between the wireless unit and AP has started and location/addressing established, the wireless unit closes its switch in operation 312, which enables the ground signal to be transmitted to the next wireless unit in the powered-up column along the token line. Association and other communication continue between the wireless unit and the AP and server in operation 314 after the unit closes its switch. If the unit is not the last in the column, the ground signal propagates to the next wireless unit in the powered-up column in operation 316. The next unit should then detect ground on its token line in operation 308 and begin identification and association with the AP and server in operation 310. The process continues from the first unit to each sequential wireless unit in the column.

If the unit is the last unit in the powered-up column and the column is the last one in the network, as determined in operations 318 and 320, respectively, the identification and association process ends. However, if the last unit in a column has started identification with the AP and server and there are wireless units in one or more columns that still require identification, as determined in operations 318 and 320, the next column or columns are powered up in operation 302. Wireless units in these column(s) are then identified starting at the first unit by sequentially closing a switch in each unit after that unit has been identified. As a result, the wireless network is able to quickly and automatically identify wireless units, such as units in airplane passenger seats, using a simple ground line with corresponding switches in each unit.

The above-described embodiments of the present invention are merely meant to be illustrative and not limiting. For example, a single AP is shown in the figures; however, a network may comprise multiple APs for the wireless communication and the wireless units may select the "best" AP or communicate with multiple APs. Further, multiple network controlled power supplies (equal to the number of columns) are illustrated to power individual columns of wireless units. However, the number of power supplies can be less than the number of columns, as long as power can be supplied to a desired one or ones of the columns. It will thus be obvious to those skilled in the art that various changes and modifications may be made without departing from this invention in its broader aspects. Therefore, the appended claims encompass all such changes and modifications as fall within the true spirit and scope of this invention.

What is claimed is:

1. A method for identifying units in a wireless network comprising an access point (AP) and at least one column of wireless units, the method comprising:

supplying power to the units in a first column;

providing a ground signal to a first unit in the first column;

transmitting physical location/address information between the first unit and the AP;

providing the ground signal to a second unit in the first column; and transmitting physical location/address information between the second unit and the AP.

2. The method of claim 1, further comprising sequentially providing the ground signal to subsequent units in the first column and transmitting physical location/address information between the unit detecting the ground signal and the AP.

3. The method of claim 1, wherein providing the ground signal to the second unit comprises closing a switch in the first unit to connect the ground signal in the first unit to the second unit.

4. The method of claim 1, wherein the wireless network comprises a server configured to communicate with the wireless units through the AP.

5. The method of claim 1, further comprising:

supplying power to the units in a second column after physical location/address information has been transmitted between the last unit in the first column and the AP;

providing a ground signal to a first unit in the second column;

transmitting physical location/address information between the first unit in the second column and the AP;

providing the ground signal to a second unit in the second column; and transmitting physical location/address information between the second unit in the second column and the AP.

6. The method of claim 5, wherein the supplying is with a power supply coupled to every unit in a column.

7. The method of claim 5, wherein the second column comprises a plurality of groupings of the wireless units.

8. The method of claim 1, wherein each of the wireless units is part of an airplane passenger seat.

9. The method of claim 1, wherein transmitting the physical location/address information comprises an association process between the unit and the AP.

10. The method of claim 1, wherein the first column comprises a plurality of groupings of the wireless units.

11. A wireless network, comprising:

an access point (AP);

a first wireless unit capable of wireless communication with the AP, wherein the first wireless unit includes a first switch;

a second wireless unit capable of wireless communication with the AP, wherein the second wireless unit includes a second switch;

a first line segment connected to a ground and to the first wireless unit; and a second line segment connected the first switch and to the second wireless unit, wherein the first switch is operable to connect the ground to the second wireless unit.

12. The wireless network of claim 11, further comprising a server in communication with the AP.

13. The wireless network of claim 12, further comprising a power supply coupled to the first and second wireless units and the server.

14. The wireless network of claim 11, wherein each wireless unit is associated with an airplane seat.

15. The wireless network of claim 11, wherein the first switch connects the second wireless unit to ground after physical location/address information is communicated between the first wireless unit and the AP.

16. The wireless network of claim 11, further comprising a plurality of wireless units in a column and a plurality of line segments connecting adjacent wireless units, wherein each wireless unit comprises a switch operable to connect the ground to a subsequent wireless unit.

17. The wireless network of claim 11, wherein the first and second wireless units form a first column, the network further comprising a plurality of wireless units forming a second column.

18. A method for automatically identifying seats located in a plurality of columns in an airplane, wherein the first seat in each column of seats is connected to a ground, the method comprising:

determining a column of seats for reconfiguration;

supplying power to the column of seats;

assigning a physical location/address to the first seat in the column;

propagating the ground to a second seat in the column; and assigning a physical location/address to the second seat in the column.

19. The method of claim 18, further comprising continuing to propagate the ground and assigning a physical location/address sequentially to subsequent seats in the column until the last seat in the column has been reconfigured.

20. The method of claim 19, further comprising determining a second column of seats for reconfiguration, supplying power to the second column, and sequentially propagating ground and assigning a physical location/address to each seat in the second column.

21. The method of claim 18, wherein the propagating comprises operating a switch to connect the ground from a current seat to a directly adjacent subsequent seat.

22. The method of claim 18, wherein the assigning is in a wireless network.

23. A system in an airplane for identifying seats, comprising:

an access point (AP);

a server in communication with the AP;

a first column of seats, wherein each seat is associated with a wireless unit and a switch;

a first power supply coupled to the server for supplying power to the first column of seats;

a first serial ground line connectable to adjacent wireless units in the first column by the switches in the seats, wherein the first ground line is sequentially connected to subsequent seats in the first column as each seat is identified to the AP;

a second column of seats, wherein each seat is associated with a wireless unit and a switch;

a second power supply coupled to the server for supplying power to the second column of seats; and a second serial ground line connectable to adjacent wireless units in the second column by the switches in the seats, wherein the ground line is sequentially connected to subsequent seats in the second column as each seat is identified to the AP.

* * * * *